United States Patent
Dobbs et al.

(10) Patent No.: US 7,825,538 B2
(45) Date of Patent: Nov. 2, 2010

(54) POWER DISTRIBUTION SYSTEM UTILIZING REDUNDANT AC SOURCES OR DC SOURCES

(75) Inventors: Robert William Dobbs, Granite Bay, CA (US); Kevin Michael Somervill, Newport News, VA (US); Sachin Navin Chheda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 346 days.

(21) Appl. No.: 10/777,505

(22) Filed: Feb. 11, 2004

(65) Prior Publication Data

US 2005/0177756 A1    Aug. 11, 2005

(51) Int. Cl.
*H02J 1/10* (2006.01)
*H02J 3/38* (2006.01)
*H02J 7/34* (2006.01)

(52) U.S. Cl. ........................................................ 307/44
(58) Field of Classification Search .................. 307/44; 713/300
See application file for complete search history.

(56) References Cited

U.S. PATENT DOCUMENTS

| | | | |
|---|---|---|---|
| 4,539,487 A | | 9/1985 | Ishii |
| 5,861,684 A | * | 1/1999 | Slade et al. .................... 307/66 |
| 6,034,444 A | | 3/2000 | Kuruma et al. |
| 6,153,946 A | * | 11/2000 | Koch et al. .................... 307/64 |
| 6,735,704 B1 | | 5/2004 | Butka et al. |
| 2002/0153777 A1 | | 10/2002 | Dishman et al. .............. 307/64 |
| 2004/0003306 A1 | | 1/2004 | Oomori ....................... 713/300 |
| 2004/0228087 A1 | * | 11/2004 | Coglitore ..................... 361/687 |

* cited by examiner

*Primary Examiner*—Jared J Fureman
*Assistant Examiner*—Carlos Amaya

(57) ABSTRACT

A power distribution system includes a plurality of loads and a plurality of power sources. The power distribution system also includes an interconnect arrangement including a plurality of interconnects. The interconnects connect each load to a given number of different ones of the sources so that each load is fully powered notwithstanding failure of any one of the sources.

12 Claims, 5 Drawing Sheets

POWER DISTRIBUTION SYSTEM UTILIZING REDUNDANT AC SOURCES OR DC SOURCES

BACKGROUND OF THE INVENTION

The present invention is generally directed to a power system for providing power to a plurality of loads, such as, a computer system. The present invention is more particularly directed to such a power system which is capable of being sourced by redundant sources to provide flexibility and reliability.

There are many applications where a power system must provide reliable power to the system which it powers. A computer system is one example.

Previous computer systems were generally provided with their own AC input power supplies. These AC "front-end" supplies produced positive DC voltage outputs. From these positive DC voltage outputs, power subsystems produced mid- and low-rail voltages. When these computer systems needed to be adapted for use in the Telecom industry, power system redesign was required due to the −48 V DC voltages available to power the computer system. In the end, the computer system power supplies for the Telecom industry were difficult to design, required higher component density, were more expensive, and required long lead-times. To provide power supply redundancy for reliability, two similar supplies were generally employed.

It is generally desirable for computer systems in general, and those used in the Telecom industry specifically, to be continuously powered. Telecom systems utilized in the Telecom industry are generally rack mounted as is the telephone equipment. The racks are generally standardized to accept computer equipment, such as computer servers, hereinafter referred to as a load, of a preset width of, for example, 19 inches, and a whole number of height units referred to as "U's".

Once a rack is configured with its loads, it is then necessary to match it with a rack of power sources. It would be desirable to be able to configure the power distribution system so that all of the loads would remain fully powered at all times. This would require redundancy in power sources. Unfortunately, redundancy of this kind has been difficult to obtain in the past. This is due to the fact that loads could not use the −48 V DC commonly directly available in the Telecom industry, but instead, each had its own power supply to provide required DC voltages from AC inputs. As a result, power distribution systems incorporating loads, such as computer equipment, for use in the Telecom industry, required power input redesign to enable the equipment to be powered directly from the standard DC voltage available in the Telecom industry environment. One such power distribution system directed to this end which provides full power source redundancy is disclosed, for example, in copending U.S. patent application Ser. No. 10/773,008, filed Feb. 6, 2004, and titled REDUNDANT INPUT POWER SYSTEM, which application is incorporated herein by reference. The system disclosed in this application permits loads, such as computer equipment, to be standardized for receipt within a rack of preset width and having a height equal to a whole number of height units. This also permits standardization of power sources. For example, six AC power supply providing 1,000 watts each of DC power at −48 V DC may have a rack height of 3 U. Similarly, multiple standard 2,000 watt, −48 V DC battery supply feeds from the telecom industry's bus bar infrastructure are normally available above the racks. Both the AC sources and DC sources may provide the same DC output voltage of, for example, −48 V DC.

When configuring a power distribution system, once a rack of loads is configured, it is then necessary to configure the power sources for those loads. As previously mentioned, it is desirable to so configure the power sources such that the sources are interconnected with the loads in a manner which provides complete and continuous power to each of the loads notwithstanding failure of one of the power sources. This provides the desired redundancy. Further, it would be most desirable to so configure the power distribution system such that the number of power sources is reduced to a minimum while providing the desired redundancy. The present invention addresses these issues and requirements.

SUMMARY OF THE INVENTION

According to one embodiment, a power distribution system comprises at least one load, a plurality of power sources, and an interconnect arrangement including a plurality of interconnects. The interconnects connect each load to a given number of the power sources so that each load is fully powered, and if any one source fails, all loads remain fully powered.

According to another embodiment, the invention provides a method of distribution full power to each one of a plurality of loads. The method comprises the steps of providing a plurality of power sources, the power sources being sufficient in number and capacity such that a combination of less than all of the sources is sufficient to power each load, and connecting each load to a given number of the sources so that if any one source fails, each of the loads remains fully powered.

These and various other features as well as advantages of the present invention will be apparent from a reading of the following detailed description and a review of the associated drawings.

DESCRIPTION OF THE INVENTION

In the following detailed description of an exemplary embodiment of the invention, reference is made to the accompanying drawings, which forms a part hereof. The detailed description and the drawings illustrates specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined by the appended claims.

Figure 1:
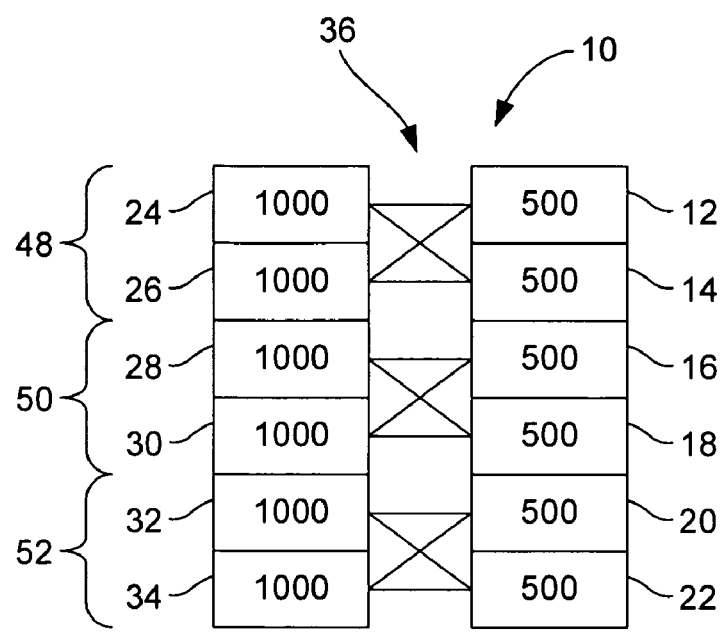
FIG. 1 is a schematic block diagram of a power distribution system embodiment of the invention which includes six 1,000 watt AC sources and six 500 watt loads.

FIG. 1 is a schematic block diagram of one embodiment of the invention. The power distribution system 10 there illustrated includes a plurality of loads 12, 14, 16, 18, 20, and 22 and a plurality of sources 24, 26, 28, 30, 32, and 34. The system 10 further includes an interconnect arrangement 36 which connects the loads to the sources in a manner to be described more particularly hereinafter.

The system 10 may, for example, be a power distribution system of a Telecom facility. To that end, the loads 12, 14, 16, 18, 20, and 22 may be computer servers or related electrical/electronic devices. The loads are preferably adapted to be powered from −48 V DC power feeds as is common in the Telecom industry. Each of the loads 12, 14, 16, 18, 20, and 22 includes provisions for multiple power source inputs to provide redundant input power sources. The inputs of each of the loads may be configured as described, for example, in the aforementioned copending application Ser. No. 10/773,008, which is incorporated herein by reference.

Correspondingly, each of the sources 24, 26, 28, 30, 32, and 34 provide an output DC voltage compatible with the loads 12, 14, 16, 18, 20, and 22. To this end, each of the sources preferably provides a −48 V DC output.

For purposes of describing the illustrative embodiments of the present invention, each of the power distribution systems described herein will be assumed to be a power distribution system for use in the Telecom industry wherein the sources provide −48 V DC and the loads utilize −48 V DC to sustain their operation. Also, it will also be assume that each of the loads makes provision for multiple power source inputs such as described in the aforementioned application Ser. No. 10/773,008, incorporated herein by reference.

Also, for this embodiment and each of the other embodiments described herein, it will be assumed that the power sources are DC power sources which provide −48 V DC. The power sources may take the form of direct DC feeds, in a manner known in the art, or each power source may be an AC power supply which converts AC voltages to a −48 V DC voltage.

In accordance with this embodiment, each of the sources 24, 26, 28, 30, 32, and 34 is an AC source. Each of the sources is capable of providing 1,000 watt of −48 V DC power.

The interconnect arrangement 36 comprises a plurality of interconnects. The interconnects connect each load to a given number of the sources so that each load is fully powered and if any one source fails, all loads remain fully powered. To that end, it will be noted that load 12 is coupled to source 24 and source 26. Load 14 is also coupled to source 24 and source 26. Similarly, each of loads 16 and 18 is coupled to source 28 and source 30. Also similarly, each of loads 20 and 22 is coupled to source 32 and source 34.

The power distribution system 10 may be divided into power distribution subsystems 48, 50, and 52. Subsystem 48 includes loads 12 and 14 and sources 24 and 26. Subsystem 50 includes loads 16 and 18 and sources 28 and 30. Lastly, subsystem 52 includes loads 20 and 22 and sources 32 and 34. As will be noted, each subsystem includes first and second X watt loads and first and second 2X watt sources, wherein X is equal to 500. Each subsystem further includes interconnects that connect the first X watt load to the first and second 2X watt sources, and the second X watt load to the first and second 2X watt sources.

As a result from the foregoing, any one of the power sources 24, 26, 28, 30, 32, and 34 may fail and each of the loads 12, 14, 16, 18, 20, and 22 will remain fully powered. The power distribution system configuration of FIG. 1 hence provides reliability and continuous power to the loads. In addition, any one power source within a single subsystem can fail and the loads will remain fully powered.

Figure 2:
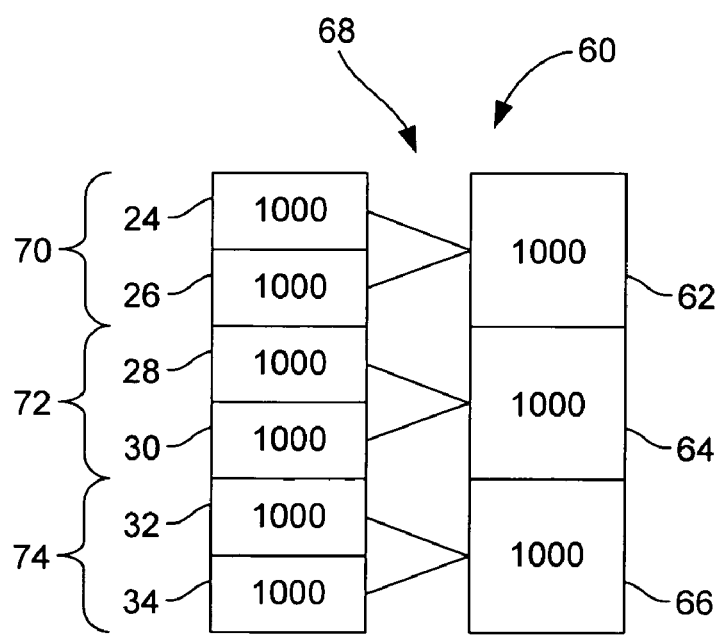
FIG. 2 is a schematic block diagram of a power distribution system embodiment of the invention which includes six 1,000 watt AC sources and three 1,000 watt loads.

Referring now to FIG. 2, it illustrates another power distribution system 60 embodying the present invention. The distribution 60 includes 1,000 watt loads 62, 64, and 66 and the 1,000 watt power sources 24, 26, 28, 30, 32, and 34. The system 60 also includes an interconnect arrangement 68.

The interconnect arrangement 68 includes a plurality of interconnects. The interconnects connect load 62 to sources 24 and 26, load 64 to sources 28 and 30, and load 66 to sources 32 and 40. As a result, the interconnects connect each load to a given number of the sources so that each load is fully powered and, if any one source fails, all loads will remain fully powered.

Again, the system 60 may be divided into subsystems 70, 72, and 74. Each of the subsystem, as a result, includes one 2X watt load and first and second 2X watt sources, where X is equal to 500. Each subsystem also includes a plurality of interconnects which interconnect the 2X watt load of each subsystem to its first and second 2X watt sources.

Figure 3:
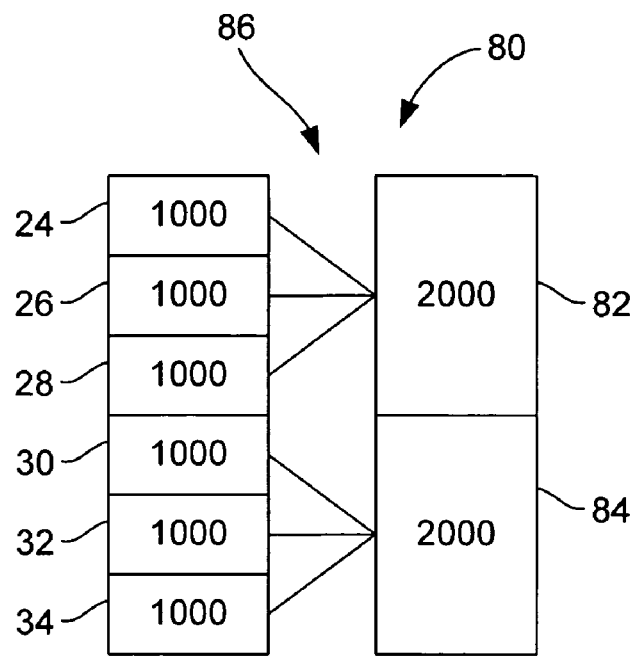
FIG. 3 is a schematic block diagram of a power distribution system embodiment of the invention which includes six 1,000 watt AC sources and two 2,000 watt loads.

FIG. 3 shows another embodiment of the present invention. Here, a power distribution system 80 includes 2,000 watt loads 82 and 84 and the 1,000 watt sources 24, 26, 28, 30, 32, and 34. The system 80 further includes an interconnect arrangement 86. The interconnect arrangement 86 connects load 82 to sources 24, 26, and 28, and load 84 to sources 30, 32, and 34. As a result, and in accordance with the present invention, the interconnect arrangement connects each load to a given number of sources so that each load is fully powered and remains fully powered even if any one source fails.

Figure 4:
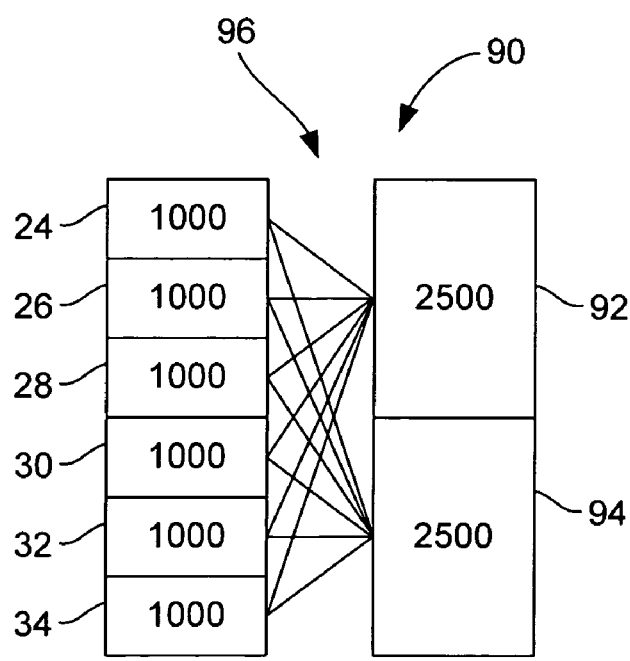
FIG. 4 is a schematic block diagram of a power distribution system embodiment of the invention which includes six 1,000 watt AC sources and two 2,500 watt loads.

FIG. 4 illustrates a still further embodiment of the present invention. The power distribution system 90 thereshown includes 2,500 watt loads 92 and 94 and the sources 24, 26, 28, 30, 32, and 34. The system 90 further includes an interconnect arrangement 96 which interconnects each of the loads 92 and 94 to each of the sources 24, 26, 28, 30, 32, and 34. As a result, the system 90 includes at least one 5X watt load, wherein X is equal to 500, and first, second, third, fourth, fifth, and sixth 2X watt sources. The system further includes an interconnect arrangement which connects the 5X watt load to each of the 2X watt sources. As a result, each load is fully powered and remains fully powered even if one source should fail.

Figure 5:
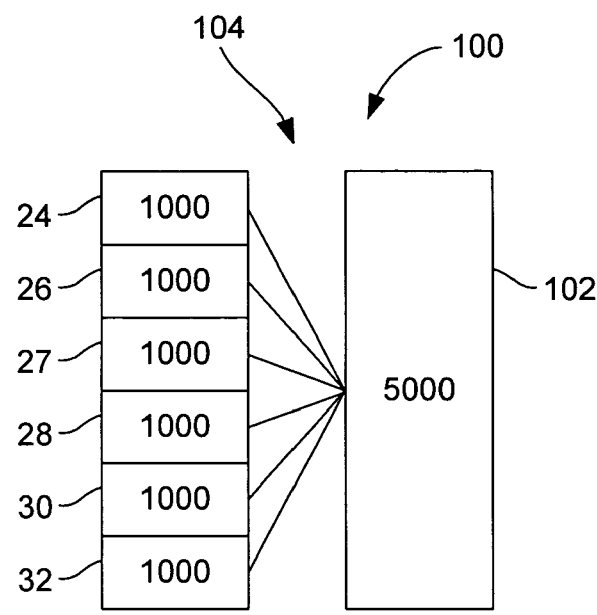
FIG. 5 is a schematic block diagram of a power distribution system embodiment of the invention which includes six 1,000 watt AC sources and one 5,000 watt load.

FIG. 5 illustrates a still further embodiment of the present invention. The power distribution system 100 of FIG. 5 includes a 5,000 watt load 102 and sources 24, 26, 27, 28, 30, and 32. The system 100 also includes an interconnect arrangement 104 that connects the load 102 to each of the power sources. Since there are six power sources, each capable of providing 1,000 watts of power, and a load which may consume up to 5,000 watts of power, the load 102 will be fully powered even if one of the sources should fail.

Figure 6:
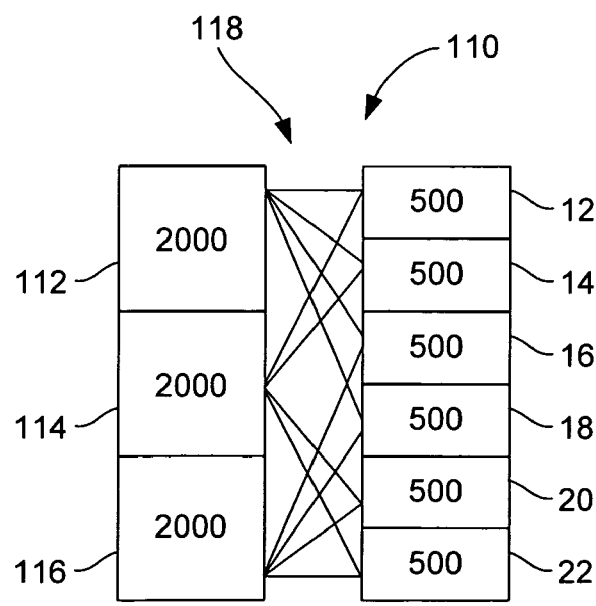
FIG. 6 is a schematic block diagram of a power distribution system embodiment of the invention which includes three 2,000 watt DC sources and six 500 watt loads.

FIG. 6 shows a still further embodiment of the present invention. Here, the power distribution system 110 includes the 500 watt loads 12, 14, 16, 18, 20, and 22, and first, second, and third 2,000 watt sources 112, 114, and 116. The power distribution system 110 further includes an interconnect arrangement 118. The interconnect arrangement 118 connects each of loads 12 and 14 to sources 112 and 114, each of loads 16 and 18 to sources 112 and 116, and each of loads 20 and 22 to sources 114 and 116. Hence, it will be noted in FIG. 6, that the system 110 includes six X watt loads, three 4X watt sources, wherein X is equal to 500, and interconnects that connect each of the X watt loads to two of the 4X watt sources while connecting each of the 4X watt sources to four different ones of the X watt loads. As a result, each of the loads will remain fully powered even if one of the sources should fail.

Figure 7:
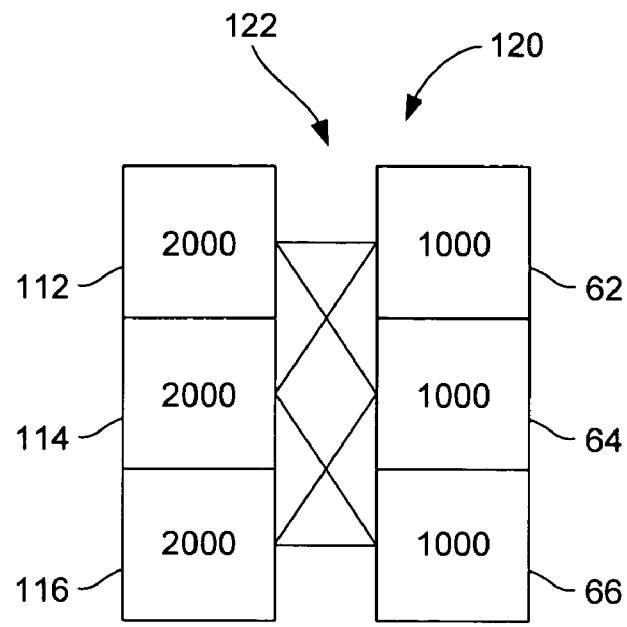
FIG. 7 is a schematic block diagram of a power distribution system embodiment of the invention which includes three 2,000 watt DC sources and three 1,000 watt loads.

FIG. 7 shows a still further embodiment of the present invention. Here, the power distribution system 120 includes the 1,000 watt loads 62, 64, and 66, and the 2,000 watt sources 112, 114, and 116. The system 112 further includes an interconnect arrangement 122 which connects load 62 to sources 112 and 114, load 64 to sources 112 and 116, and load 66 to sources 114 and 116. Hence, the system 120 includes three 2X watt loads and three 4X watt sources, wherein X is equal to 500. The interconnects interconnect each of the 2X watt loads to two different ones of the 4X watt sources while connecting each of the 4X watt sources to two different ones of the 2X watt loads. As a result, in accordance with the present invention, each of the loads 62, 64, and 66 will remain fully powered even if one of the sources 112, 114, and 116 should fail.

Figure 8:
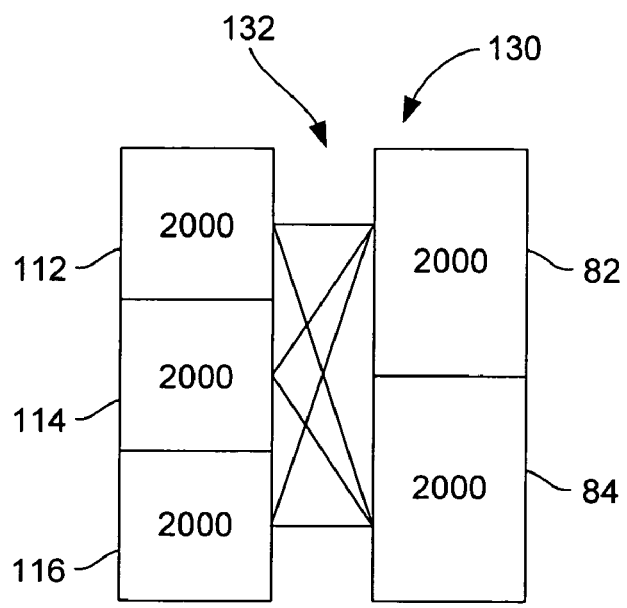
FIG. 8 is a schematic block diagram of another power distribution system embodiment of the invention which includes three 2,000 watt DC sources and two 2,000 watt loads.

FIG. 8 shows another embodiment of the present invention. Here, the power distribution system 130 includes the 2,000 watt loads 82 and 84 and the 2,000 watt sources 112, 114, and 116. The system 130 further includes an interconnect arrangement 132. The interconnect 132 connects each of the loads 82 and 84 to each of the sources 112, 114, and 116. Hence, the system 130 includes first and second 4X watt loads and first, second, and third 4X watt sources, wherein X is equal to 500. The system 130 further includes interconnects that connect each of the 4X watt loads to each of the 4X watt loads to each of the 4X watt sources. As a result, each of the loads 82 and 84 will remain fully powered should any one of the sources 112, 114, and 116 fail.

Figure 9:
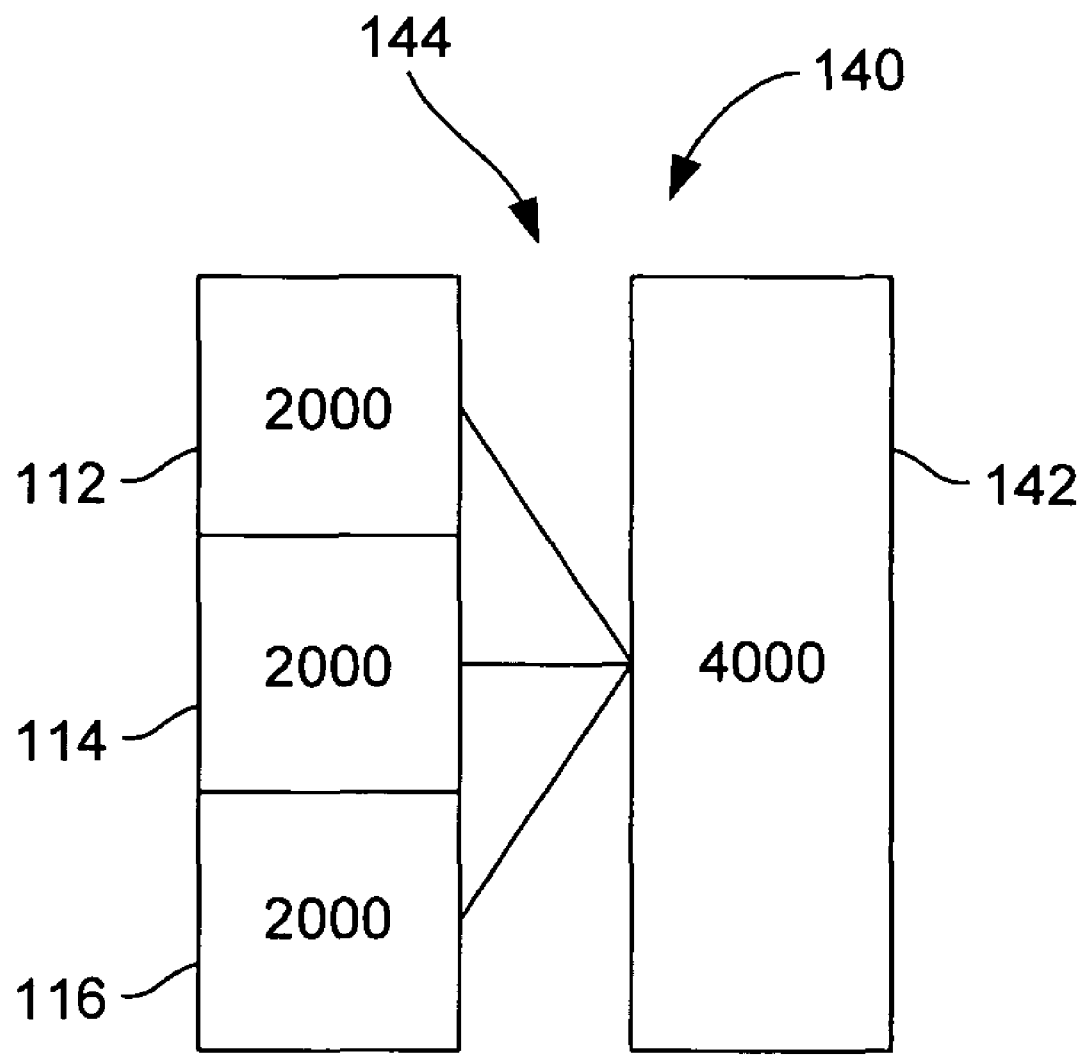
FIG. 9 is a schematic block diagram of a still further power distribution system embodiment of the invention which includes three 2,000 watt DC sources and one 4,000 watt load.

Lastly, FIG. 9 shows another embodiment of the present invention. The system 140 includes a 4,000 watt load 142 and the 2,000 watt sources 112, 114, and 116. The system 140 further includes an interconnect arrangement 144 which connects the load 142 to each of the sources 112, 114, and 116. Hence, the system includes one 8X watt load and three 4X watt sources, wherein X is equal to 500, and wherein the interconnects connect the 8X watt load to each of the 4X watt sources. As a result, the load 142 will remain fully powered should any one of the sources 112, 114, and 116 fail.

As can be seen from the foregoing, the present invention provides new and improved power distribution systems for use in, for example, the Telecom industry. Each of the loads and sources may be configured for placement into a standard 19 inch rack. Further, each of the sources and loads may have a height dimension in U increments to enable efficient use of each rack. The power distribution systems are also configured to accommodate facilities where only AC sources are provided or only DC sources are provided. In doing so, the power distribution systems according to the invention ensure continued power to each load even if one of the sources should fail while also minimizing the number of sources required to achieve that end.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims.

We claim:

1. A power distribution system comprising:
   one or more loads, each load operable to be mounted in a rack location;
   a plurality of power sources, each power source having a capacity less than each load and operable to be mounted in a rack location not having a load such that said capacity of said power sources is greater than said one or more loads; and
   an interconnect arrangement including a plurality of interconnects, the interconnects directly connecting each load to each of the sources in parallel such that each load is fully powered and if anyone source fails, each load remains fully powered.

2. The power distribution system of claim 1 wherein all of the sources are DC sources.

3. The power distribution system of claim 1 wherein all of the sources are AC sources.

4. The power distribution system of claim 1 wherein the one or more loads, the plurality of power sources and the interconnect arrangement together comprise a power distribution subsystem, wherein the one or more loads includes a 4X watt load, wherein the plurality of sources include first, second, and third 2X watt sources, and wherein the interconnect arrangement includes interconnects that connect the 4X watt load to each of the first, second, and third 2X watt sources, X having a numeric value.

5. The power distribution system of claim 1 wherein the one or more loads, the plurality of power sources and the interconnect arrangement together comprise a power distribution subsystem, wherein the one or more loads includes a 5X watt load, wherein the plurality of sources include first, second, third, fourth, fifth, and sixth 2X watt sources, and wherein the interconnect arrangement includes interconnects that connect the 5X watt load to each of the first, second, third, fourth, fifth, and sixth 2X watt sources, X having a numeric value.

6. The power distribution system of claim 1 wherein the one or more loads includes a 10X watt load, wherein the plurality of sources include first, second, third, fourth, fifth, and sixth 2X watt sources, and wherein the interconnect arrangement includes interconnects that connect the 10X watt load to each of the first, second, third, fourth, fifth, and sixth 2X watt sources, X having a numeric value.

7. The power distribution system of claim 1 wherein the one or more loads includes an 8X watt load, wherein the plurality of sources include first, second, and third 4X watt sources, and wherein the interconnect arrangement includes interconnects that connect the 8X watt load to each of the first, second, and third 4X watt sources, and wherein the interconnect arrangement includes interconnects that connect the 8X watt load to each of the first, second, and third 4X watt sources, X having a numeric value.

8. The power distribution system of claim 1 wherein the one or more loads include first and second 5X watt loads, wherein the plurality of sources include first, second, third, fourth, fifth, and sixth 2X watt sources, and wherein the interconnect arrangement includes interconnects that connect the first 5X watt load to each of the first, second, third, fourth, fifth, and sixth 2X watt sources and the second 5X watt load to each of the first, second, third, fourth, fifth, and sixth 2X watt sources, X having a numeric value.

9. The power distribution system of claim 1 wherein the number of sources is three-times the number of loads.

10. The power distribution system of claim 1 wherein the number of sources is six-times the number of loads.

11. A power distribution system comprising:
- a plurality of loads, each load operable to be mounted in a rack location;
- a plurality of power sources, the power sources having a collective capacity to fully power all of the loads and each power source having a capacity less than each load and operable to be mounted in a rack location not having a load such that said capacity of said power sources is greater than said one or more loads; and
- an interconnect arrangement including a plurality of interconnects, the interconnects directly connecting each load to each of the sources in parallel such that each load is fully powered notwithstanding failure of anyone of the sources.

12. A method of distributing full power to each one of a plurality of loads, each load operable to be mounted in a rack location, the method comprising:
- providing a plurality of power sources, each power source having a capacity less than each load and operable to be mounted in a rack location not having a load, the power sources being sufficient in number and capacity such that a combination of less than all of the sources is sufficient to power each load; and
- directly connecting each load to each of the sources in parallel such that if anyone source fails, each of the loads remains fully powered.

* * * * *

UNITED STATES PATENT AND TRADEMARK OFFICE
CERTIFICATE OF CORRECTION

PATENT NO. : 7,825,538 B2
APPLICATION NO. : 10/777505
DATED : November 2, 2010
INVENTOR(S) : Robert William Dobbs et al.

It is certified that error appears in the above-identified patent and that said Letters Patent is hereby corrected as shown below:

In column 6, line 22, in Claim 1, delete "anyone" and insert -- any one --, therefor.

In column 8, line 4, in Claim 11, delete "anyone" and insert -- any one --, therefor.

In column 8, line 16, in Claim 12, delete "anyone" and insert -- any one --, therefor.

Signed and Sealed this
Thirty-first Day of May, 2011

David J. Kappos
*Director of the United States Patent and Trademark Office*